United States Patent
George et al.

(10) Patent No.: US 12,401,575 B2
(45) Date of Patent: Aug. 26, 2025

(54) AUTOMATIC GENERATION AND MODIFICATION OF CONTACT STREAMS VIA MACHINE-LEARNING ANALYTICS

(71) Applicant: Adobe Inc., San Jose, CA (US)

(72) Inventors: William Brandon George, Pleasant Grove, UT (US); Kevin Gary Smith, Lehi, UT (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/373,036

(22) Filed: Sep. 26, 2023

(65) Prior Publication Data
US 2025/0106300 A1 Mar. 27, 2025

Related U.S. Application Data

(62) Division of application No. 16/416,536, filed on May 20, 2019, now Pat. No. 11,811,592.

(51) Int. Cl.
*H04L 41/16* (2022.01)
*G06N 7/01* (2023.01)
(Continued)

(52) U.S. Cl.
CPC ............ *H04L 41/16* (2013.01); *G06N 7/01* (2023.01); *G06N 20/00* (2019.01); *H04L 41/08* (2013.01);
(Continued)

(58) Field of Classification Search
CPC ........ G06N 20/00; G06N 3/08; H04L 67/535; H04L 67/306; H04L 67/51; H04L 67/75; H04L 41/16
See application file for complete search history.

(56) References Cited

U.S. PATENT DOCUMENTS

| 8,688,557 B2 | 4/2014 | Rose et al. |
| 10,469,664 B2 | 11/2019 | Pirat et al. |

(Continued)

OTHER PUBLICATIONS

"Adobe Analytics Features", www.adobe.com/analytics/adobe-analytics-features.html, Jul. 14, 2018.
(Continued)

*Primary Examiner* — Rachel J Hackenberg
(74) *Attorney, Agent, or Firm* — Kilpatrick Townsend & Stockton LLP

(57) ABSTRACT

In some embodiments, a contact stream is generated or modified based on configuration data received from a machine-learning model. Multiple contact items are selected for a contact stream, to be delivered to a user device via electronic communication channels. In addition, a success metric is identified indicating an engagement with the contact stream or an action performed following the engagement. A machine-learning model is applied to the contact items, where the machine-learning model is trained to identify relationships among actions in an online environment and configuration parameters that control delivery of contact streams. The machine-learning model provides an output indicating configuration data or a success probability for the contact stream. The configuration data includes configuration parameter values computed by the machine-learning model for achieving the identified success metric. The success probability indicates a probability computed by the machine-learning model for achieving the identified success metric.

17 Claims, 5 Drawing Sheets

(51) Int. Cl.
*G06N 20/00* (2019.01)
*H04L 41/08* (2022.01)
*H04L 41/22* (2022.01)
*H04L 67/50* (2022.01)
*H04L 67/51* (2022.01)
*H04L 67/75* (2022.01)

(52) U.S. Cl.
CPC .............. *H04L 41/22* (2013.01); *H04L 67/51* (2022.05); *H04L 67/535* (2022.05); *H04L 67/75* (2022.05)

(56) References Cited

U.S. PATENT DOCUMENTS

| | | | |
|---|---|---|---|
| 10,839,418 B1* | 11/2020 | Aragonda | G06Q 30/0249 |
| 10,944,706 B2 | 3/2021 | George et al. | |
| 11,494,686 B1* | 11/2022 | Mandayam Comar | G06N 20/00 |
| 2013/0041716 A1 | 2/2013 | Taylor et al. | |
| 2017/0180554 A1 | 6/2017 | McCormack et al. | |
| 2022/0051143 A1* | 2/2022 | Kobylkin | G06Q 30/0201 |
| 2022/0215428 A1* | 7/2022 | Achan | G06Q 30/0246 |

OTHER PUBLICATIONS

"Adobe Audience Manager Features", www.adobe.com/analytics/audience-manager/features.html, Aug. 22, 2018.
"Keep customers engaged. Every step of the way.", www.adobe.come/lu_en/marketing/marketo.html, Sep. 12, 2018.
"Adobe Experience Cloud Launch", May 2, 2018, 42 pages.
U.S. Appl. No. 16/419,259, Notice of Allowance, Mailed On Nov. 3, 2020, 9 pages.
U.S. Appl. No. 16/419,259, Non-Final Office Action, Mailed On Jul. 9, 2020, 32 pages.
U.S. Appl. No. 16/416,536, Notice of Allowance and Fee(s) Due, Mailed on Jul. 6, 2023, 9 pages.

* cited by examiner

AUTOMATIC GENERATION AND MODIFICATION OF CONTACT STREAMS VIA MACHINE-LEARNING ANALYTICS

RELATED APPLICATIONS

The present application is a divisional of U.S. application Ser. No. 16/416,536 entitled "Automatic Generation and Modification of Contact Streams via Machine-Learning Analytics," filed May 20, 2019, which is incorporated by reference here in its entirety.

TECHNICAL FIELD

This disclosure relates generally to the field of machine learning, and more specifically relates to modifying a contact stream based on configuration data provided by a machine-learning model.

BACKGROUND

A contact item is used to interact with a recipient within an online computing environment. A contact item, for example, is generated and communicated to a recipient who is interacting with one or more computing applications or online platforms. In some cases, the contact item alerts the recipient to an event or function that is available within the online computing environment. Contact items describe events or functions related to, for instance, security, personal or computing efficiency, consumer services, entertainment, or other areas that provide events or functions within online computing environments.

In some cases, contact items are generated or delivered based on triggers, such as actions performed by the recipient in the online computing environment. A contemporary contact platform generates a sequence of multiple contact items, and delivers the contact items based on one or more trigger actions performed by the recipient. However, contemporary techniques for generating a sequence of contact items rely on inputs from a user, such as user inputs indicating after what trigger or how often a contact item is delivered. In some cases, the user-indicated sequence fails to convey message content of the contact item to the recipient. For example, the sequence is configured based on parameters that are based on the user's personal preferences or biases.

SUMMARY

According to certain embodiments, a set of contact items is accessed, to be provided as a contact stream to one or more user devices. The contact stream includes the contact items sequenced for delivery via one or more electronic communication channels. In addition, a success metric is identified, which indicates one or more of an engagement with the contact stream, or an action to be performed following the engagement with the contact stream. A machine-learning model is applied to the set of contact items, where the machine-learning model is trained to identify relationships among configuration parameters that control delivery of contact streams and sequences of actions and outcomes performed within online environments. An output is provided. The output indicates the contact stream and configuration data for controlling the delivery of the contact stream. The configuration data includes configuration parameter values computed by the machine-learning model for achieving the identified success metric. Additionally or alternatively, the output indicates a success probability computed by the machine-learning model. The success probability indicates a probability of achieving the identified success metric. In some embodiments, a user interface is provided, the user interface configured to receive inputs indicating a selection of contact items and a sequence of the contact items in a contact stream, and a success metric. Additionally or alternatively, the user interface configured to display a success probability indicating a probability of achieving the identified success metric by creating the contact stream.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Figure 1:
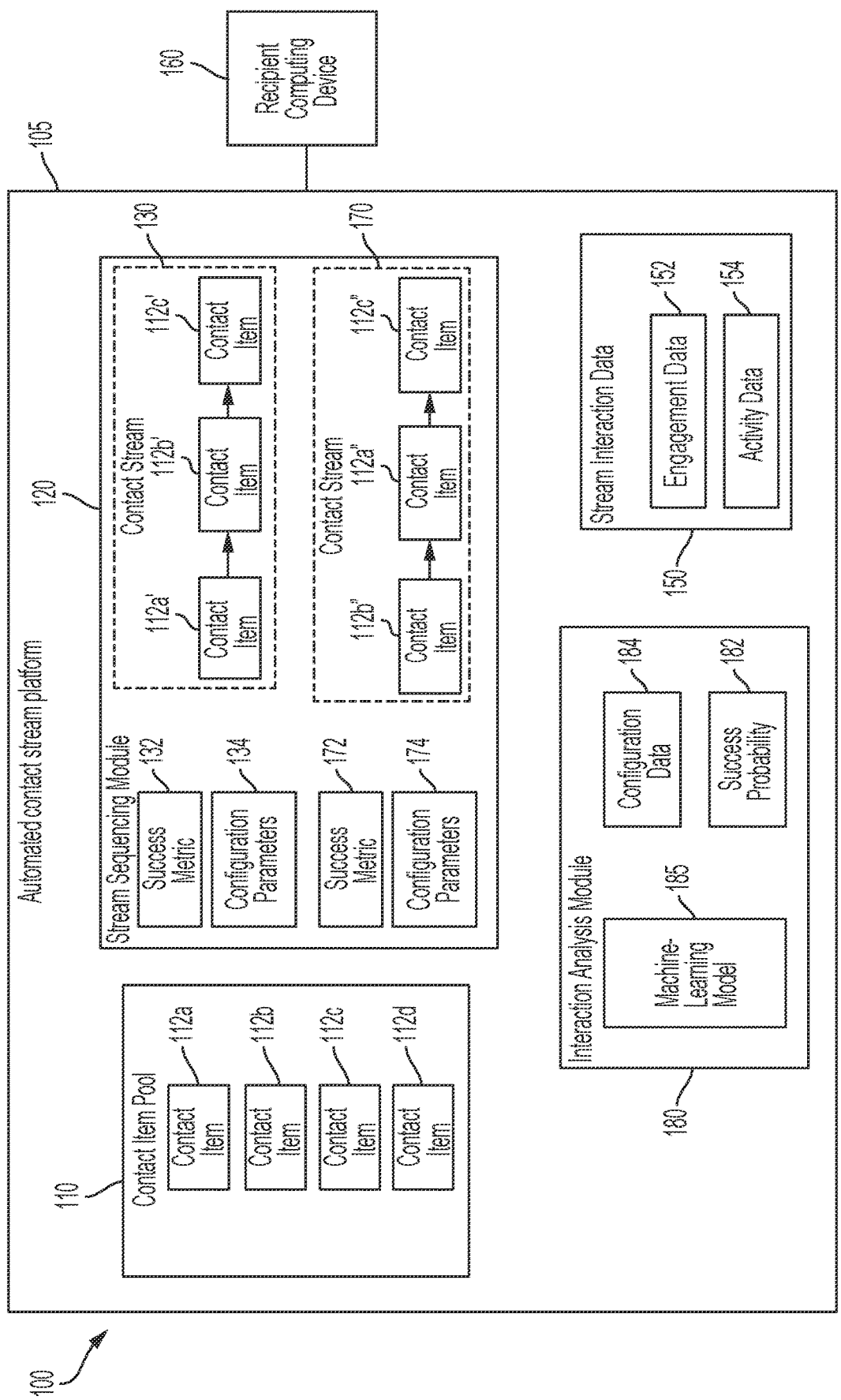
FIG. 1 is a block diagram depicting an example of an automated contact stream platform that is configured to generate or modify one or more contact streams, according to certain embodiments.

As discussed above, prior techniques for generating a sequence of contact items do not provide for automatically generating a contact stream based on machine-learning techniques. Additionally or alternatively, prior techniques for generating a sequence of contact items do not provide for automatically modifying configuration parameters that control delivery of contact items in the contact stream. Certain embodiments described herein provide for generating or modifying a contact stream based on configuration parameters that are generated via a machine-learning model. Additionally or alternatively, certain embodiments described herein provide for evaluating a success probability for a contact stream based on analysis of the contact stream via a machine-learning model.

The following examples are provided to introduce certain embodiments of the present disclosure. In one example, an automated contact stream platform is used for delivering contact streams to recipient computing devices. A contact stream includes multiple contact items that are sequenced for delivery. Each contact stream is delivered based on one or more configuration parameters, such as a communication channel via which a particular contact item is transmitted, a time or time delay for transmitting the particular contact item, or other characteristics that control how the automated contact stream platform delivers contact streams. The automated contact stream platform provides, to an end user device, a user interface via which a user, such as a website editor or a campaign editor, selects or provides contact streams for evaluation by the automated contact stream platform.

In this example, the automated contact stream platform uses a machine-learning model that is trained to identify relationships among configuration parameters and actions following engagement with a contact stream. For instance, the machine-learning model receives, as an input, a contact stream or a desired success metric for a contact stream. The success metric indicates engagement with the contact stream or an action performed subsequent to engagement with the contact stream. The machine-learning model is used to generate configuration data, a success probability, or both for the contact stream. The configuration data includes configuration parameter values (e.g., communication channel, timing, etc.) for the input contact stream that, according to the machine-learning model, optimize a probability of achieving the success metric. The success probability indicates the probability of the input contact stream achieving the input success metric.

Continuing with this example, the automated contact stream platform provides, via the user interface, the success probability or the configuration data for the contact stream being evaluated. In some cases, the user interface provides feedback to the user in real-time (e.g., in a time period short enough to be unnoticed by the user). In some cases, the automated contact stream platform modifies content of contact streams, configuration parameters of contact streams or both based on the configuration data or success probability outputted from the machine-learning model. The modification could, for instance, be performed in real-time or without human intervention (or both). In some cases, the automated contact stream platform modifies a contact stream that is already partially delivered, or in the process of being delivered. For example, based on information about previously delivered contact items in a contact stream, the machine-learning model generates configuration data for a subsequent contact item. The automated contact stream platform modifies the contact stream to deliver the subsequent contact item based on the generated configuration data.

In some implementations, a machine-learning model that provides configuration data or success probabilities for a contact stream offers improvements to communications with a recipient computing device. An automated contact stream platform that delivers contact streams can be used with communication applications in a variety of fields, including security, healthcare, transportation logistics, entertainment, and other fields. In many applications, a contact item is used to provide information to a person who is interacting with an online computing environment. However, some contemporary techniques for distributing contact items are rules-based distribution techniques, using rules that are generated by a person. In some cases, rules provided by a person reflect guesswork and biases of the person, and do not reflect conditions of a computing environment in which contact items are distributed. In some implementations, machine-learning techniques beneficially increase automation for generating a contact stream, such as by optimizing configuration parameters related to delivery of the contact stream. Additionally or alternatively, rules-based distribution of contact items provides information inefficiently. For example, delivery of repeated contact items consumes bandwidth and network resources. In addition, inefficient distribution of information consumes valuable personnel resources, such as time or attention of a person receiving the information in an inappropriate computing environment (e.g., receiving a software update alert while driving). In some cases, an automatically generated contact stream beneficially provides information to a recipient device in a more timely manner than a contact item that is delivered based on contemporary techniques.

Referring now to the drawings, FIG. 1 is a diagram depicting an example of an online computing environment 100 that includes an automated contact stream platform 105. In some implementations, the automated contact stream platform 105 is configured to generate or modify one or more contact streams. Additionally or alternatively, the automated contact stream platform 105 is configured to generate or modify one or more configuration parameters. In some cases, a configuration parameter indicates a characteristic of a contact stream. The configuration parameter indicates, for instance, a characteristic of one or more contact items included in the contact stream. Additionally or alternatively, the configuration parameter controls delivery of the contact stream, such as by indicating a characteristic related to delivery (e.g., timing, frequency, communication channel). In some cases, each contact stream is associated with a success metric, such as a metric indicating whether a recipient computing device performed an action subsequent to receiving the contact stream.

In some embodiments, the automated contact stream platform 105 includes (or is configured to communicate with) one or more of a contact item pool 110, a stream sequencing module 120, or an interaction analysis module 180. The contact item pool 110 includes, for example, multiple contact items that are available for inclusion in a contact stream that is being sequenced, such as the contact items 112a, 112b, 112c, or 112d (collectively referred to herein as contact items 112). Each of the contact items 112 includes (or is otherwise associated with) information that is intended for delivery to a recipient computing device, or a user of a recipient computing device. For example, the contact items 112 include digital data representing the intended information, such as text data, audio data, video data, or other data that is interpretable by a human recipient. In some cases, one or more of the contact items 112 is associated with an action, such as an interactive event enabled by particular digital data included in a particular contact item. For example, the digital data included in contact item 112a includes an interactive link to an online resource, such as a website address, a downloadable file, or another resource that is accessible in the online computing environment 100. Additionally or alternatively, the digital data included in contact item 112b includes an interactive telephone number, such as a number by which a telephone call could be placed or a message (e.g., short message service ("SMS"), multimedia message service ("MMS")) could be sent. Additionally or alternatively, the digital data included in contact item 112c includes an interactive email link, such as an address by which an email could be sent. In some cases, digital data in a particular contact item is not associated with an interactive event. For example, the digital data included in contact item 112d includes information that may be read (or otherwise interpreted) by a recipient user, and omits a link or other interactive data. In some cases, digital data in one or more of the contact items 112 includes identification information that uniquely identifies the digital data (e.g., a cookie, a trackable web address). Additionally or alternatively, the digital data omits identification information that uniquely identifies the digital data.

In the automated contact stream platform 105, the stream sequencing module 120 sequences contact items from the contact item pool 110 into one or more contact streams, based on one or more configuration parameters. For example, the stream sequencing module 120 sequences a contact stream 130 including contact items 112a', 112b', and 112c' (corresponding respectively to contact items 112a, 112b, and 112c in the contact item pool 110). The contact stream 130 represents the information from the included contact items, such as by including the respective digital data (or respective copies thereof) from the contact items 112a-112c. In some cases, the contact stream 130 is associated with one or more configuration parameters, such as configuration parameters 134, that describe one or more characteristics of the contact stream 130. For example, the configuration parameters 134 describe characteristics that control (or are otherwise related to) delivery of the contact stream 130. Non-limiting examples of characteristics described by configuration parameters include delivery timing (e.g., time of day, calendar dates), frequency, communication channel for delivery (e.g., email, text message, online messaging service, telephone call), quantity of retries (e.g., retrying delivery after a failed delivery), type or quantity of trigger actions, or any other suitable characteristic of a contact stream. In some cases, the contact stream 130 is configured (e.g., via the associated configuration parameters 134) to deliver each of the contact items 112a', 112b', and 112c' responsive to a respective trigger action. In some cases, a trigger action includes an activity or event performed by a recipient user, such as browsing to a website, reading an email, placing a telephone call, watching a video, or any other suitable action performed by the recipient user. Additionally or alternatively, a trigger action includes one or more criteria, such as criteria specifying an activity or event performed via a particular computing device. Trigger actions described by an included criteria increase, for example, relevancy of a delivered contact item, such as by triggering delivery of a contact item while the recipient user is using an appropriate computing device that is consistent with information included in the contact item (e.g., delivering a computer software update alert while the user is using a personal computer). In FIG. 1, trigger actions are performed via a recipient computing device associated with the recipient user, but other implementations are possible. For example, in some implementations trigger actions are performed by an additional computing device that is associated with a different user (e.g., a friend or colleague of the recipient user).

For contact stream 130, the respective trigger actions are described by one or more of the configuration parameters 134. Additionally or alternatively, the contact stream 130 is associated with at least one success metric, such as a success metric 132. In some cases, a success metric indicates an intended activity or event, such as an activity or event performed by the recipient user subsequent to receiving a contact stream. Non-limiting examples of a success metric include responding to a security check, downloading an electronic file, updating a software application, engaging with an online service, purchasing a product, or any other suitable activity or event. In some cases, the success metric describes an activity or event that is performed via a delivered contact item in the contact stream, such as via a website address included in the contact item. Additionally or alternatively, the success metric describes an activity or event that is performed subsequent to engaging with the contact stream.

In the automated contact stream platform 105, the stream sequencing module 120 sequences the contact stream 130 based on the configuration parameters 134, the success metric 132, or both. The sequenced contact stream 130 is delivered to one or more recipient computing devices in the online computing environment 100, such as to a recipient computing device 160 that is associated with a recipient user. For example, the contact item 112a' is delivered to the recipient computing device 160 based on at least one of the configuration parameters 134, such as one or more parameters indicating a trigger action (or criteria for a trigger action), a communication channel, or other delivery characteristics. Subsequent to receiving the contact item 112a', the recipient computing device 160 performs one or more activities in the online computing environment 100. In some cases the automated contact stream platform 105 determines that the recipient computing device 160 has performed a trigger action that is described by one or more of the configuration parameters 134. Responsive to determining that the trigger action is performed, an additional contact item from the contact stream 130 is delivered, such as contact item 112b'. Although FIG. 1 depicts the contact items from the contact stream 130 as being delivered to the recipient computing device 160, other implementations are possible. For example, responsive to determining that a trigger action is performed by a computing device associated with a recipient user, an additional contact item from the stream 130 is delivered to an additional computing device that is associated with a friend or coworker of the recipient user.

In some cases, interaction data, such as stream interaction data 150, is generated based on the activities of the recipient computing device 160. For example, the stream interaction data 150 is generated by the automated contact stream platform 105. Additionally or alternatively, the stream interaction data 150 is received by the automated contact stream platform 105 from an additional computing platform, such as a computing platform configured to provide website analytics. The stream interaction data 150 describes interactions with the delivered contact stream 130. For example, the stream interaction data 150 includes engagement data 152, such as data describing activities engaging with one or more delivered contact items. Additionally or alternatively, the stream interaction data 150 includes activity data 154, such as data describing activities that are performed after engagement with the delivered contact items 112a', 112b', or 112c' is complete. In some cases, the engagement data 152 describes engagement with digital data included in one or more of the contact items 112a', 112b', or 112c', such as reading information, following a link, or other interactions with the contact item. Additionally or alternatively, the activity data 154 describes activities performed after the engagement is with the digital data is completed. In some cases, the automated contact stream platform 105 determines one or more trigger actions based on the stream interaction data 150, and delivers an additional contact item responsive to receiving the stream interaction data 150 indicating the trigger action is completed.

In the automated contact stream platform 105, the interaction analysis module 180 accesses the stream interaction data 150. Based on the stream interaction data 150, the interaction analysis module 180 determines whether the success metric 132 associated with the contact stream 130 is fulfilled. As a non-limiting example, the success metric 132 indicates downloading of a software update via the recipient computing device 160 (e.g., the contact stream 130 is successful upon the recipient computing device 160 downloading the update). In some embodiments, the interaction analysis module 180 determines characteristics associated with the success metric 132. Non-limiting examples of characteristics associated with a success metric are a time duration (e.g., time between initiating delivery of a contact stream or contact item and achieving the success metric), quantity of retries (e.g., multiple deliveries of a contact item), quantity of repetitions (e.g., repeated actions of a recipient computing device), or any other suitable characteristic of the success metric.

In some cases, a machine-learning model 185 included in the interaction analysis module 180 is trained (or re-trained) to identify relationships among configuration parameters and interactions with contact streams, based on stream interaction data and at least one success metric. The machine-learning model 185 is trained to provide one or more outputs related to sequencing of contact streams. For example, the machine-learning model 185, based on its training, provides an output indicating one or more of configuration data or a success probability. In some cases, the configuration data describes one or more configuration parameters that optimize a probability achieving a particular success metric for a particular contact stream that is being sequenced. Additionally or alternatively, the success probability indicates a likelihood of the particular contact stream, if it were to be delivered, achieving the particular success metric. In some embodiments, the machine-learning model 185 receives as training data (or re-training data) information that is associated with the contact stream 130, such as the success metric 132, the configuration parameters 174, and the stream interaction data 150. In some cases, the training data includes an indication that the success metric 132 is fulfilled. Additionally or alternatively, the machine-learning model 185 determines, based on the stream interaction data 150, that the success metric 132 is fulfilled. Non-limiting examples of models for the machine-learning model 185 include a regression model, a random forest model, or any other suitable machine-learning model.

In some cases, a contact stream that is being sequenced is modified based on an output of a machine-learning model. For example, the stream sequencing module 120 sequences an additional contact stream 170 including contact items 112a", 112b", and 112c" (corresponding respectively to contact items 112a, 112b, and 112c in the contact item pool 110), and representing the information from the included contact items. In some cases, the contact stream 170 is configured to deliver each of the contact items 112a", 112b", and 112c", based on one or more configuration parameters 174 that describe one or more characteristics of the contact stream 170. Additionally or alternatively, the contact stream 170 is associated with at least one success metric, such as a success metric 172.

In the automated contact stream platform 105, the machine-learning model 185 receives one or more inputs related the contact stream 170 that is being sequenced by the stream sequencing module 120. For example, the machine-learning model 185 receives inputs indicating one or more of the success metric 172, the configuration parameters 174, or the group of contact items 112 (or a subset thereof). The machine-learning model 185 identifies, based on its training, a first relationship between the configuration parameters 174 and historical configuration parameters, such as the configuration parameters 132 included in training data for the machine-learning model 185. Additionally or alternatively, the machine-learning model 185 identifies a second relationship between the success metric 172 and historical actions performed in the online computing environment 100, such as actions described by the stream interaction data 150.

Based on the identified relationships, the machine-learning model 185 provides one or more outputs. For example, the machine-learning model 185 determines a success probability 182 of the success metric 172 being achieved based on the sequenced contact stream 170. Additionally or alternatively, the machine-learning model 185 determines configuration data 184 that describes one or more values for configuration parameters, such as values that optimize a probability of the success metric 172 being achieved. The configuration data includes, for example, a value for one or more configuration parameters, such as values for a communication channel, a time of delivery, a trigger action, criteria for a trigger action, or any other suitable parameter value. In some cases, a trained machine-learning model determines configuration data that reflects conditions of an online computing environment more accurately than a rules-based selection of configuration data. For example, a website editor who configures a contact stream for the online computing environment 100 could guess at how a recipient user might behave in the environment 100, based on the website editor's personal biases or preconceptions of recipient behavior. The configuration data 174 determined by the machine-learning model 185 reflects the actions of computing devices in the online computing environment 100, for example, while omitting biases in the configuration data.

In some embodiments, a contact stream being sequenced is modified based on an output of an machine-learning model. In the automated contact stream platform 105, the contact stream 170 is modified based on the outputs from the machine-learning model 185. For example, one or more values of the configuration parameters 174 are modified based on the configuration data 184. Additionally or alternatively, a particular contact item in the contact stream 170 is modified, such as removing or adding a contact item. As a non-limiting example, the contact stream 170 could be modified to omit one or more of the contact items 112a", 112b", and 112c", to include an additional contact item (e.g., corresponding to contact item 112d in the contact item pool 110), or both. In some embodiments, a contact stream is modified during delivery of the contact stream, such as a modification of the contact stream 170 (or a portion of the contact stream 170) subsequent to delivery of a portion of the contact stream 170. For example, based on the outputs from the machine-learning model 185, contact item 112c" is modified subsequent to delivery of one or more of contact items 112a" or 112b". In some cases, modifying a contact stream based on an output received from a machine-learning model improves a composition of the contact stream. For example, using the machine-learning model increases relevance of information included in contact items for the contact stream, by determining what contact items result in a recipient user acting on the included information. Additionally or alternatively, using the machine-learning model improves timeliness for delivering the contact items in the modified contact stream, such as by determining a trigger action (or criteria for a trigger action) that results in the user recipient promptly acting on the included information. In some cases, modifying a contact stream based on an output from a machine-learning model optimizes configuration parameters for the contact stream by adjusting the parameter values to maximize a success probability for the stream.

As a non-limiting example, the contact stream 130 describes information intended for an employee at an organization, such as information describing a security update procedure for the organization. The employee, for example, is the recipient user associated with the recipient computing device 160. In this example, the contact item 112a' includes an address link to a website, such as a security website including a downloadable security update. In addition, the contact item 112a' is delivered to the recipient computing device 160 via an email communication channel, based on the configuration parameters 134. The engagement data 152 indicates whether the address link had been engaged (e.g., followed). Engagement with the contact item 112a' is completed once the example link is followed. The activity data 154 indicates activities performed on the security website addressed by the example link, such as downloading the security update, or other activities that are performed subsequent to the engagement with the contact item 112a'.

In this example, the automated contact stream platform 105 determines, based on the stream interaction data 150, that a trigger action is performed via the recipient computing device 160, such as downloading the security update. Responsive to determining that the trigger action is completed, the contact item 112b' is delivered to the recipient computing device 160 via an email communication channel, based on the configuration parameters 134. In this example, the contact item 112b' includes an additional address link to an additional website, such as a training website that displays a tutorial video describing the security update. The engagement data 152 is modified, for example, to indicate whether the additional address link had been engaged. In addition, the activity data 154 is modified, for example, to indicate activities performed on the training website, such as viewing the tutorial video. In this example, the automated contact stream platform 105 determines, based on the stream interaction data 150, that an additional trigger action is performed via the recipient computing device 160, such as viewing the tutorial video. Responsive to determining that the additional trigger action is completed, the contact item 112c' is delivered. In this example, the contact item 112c' is delivered to an additional computing device that is associated with a manager of the employee. In addition, the contact item 112c' is delivered, based on the configuration parameters 134, via an online messaging service communication channel, such as a messaging service in a website portal that is accessed by the manager via the additional computing device. The contact item 112c' includes information indicating, for example, that the employee has completed the security update procedure.

Continuing with this example, the machine-learning model 185 is trained based on, at least, information describing the contact stream 130 or associated information. For instance, the machine-learning model 185 determines, based on its training, a relationship between, at least, the configuration parameters 134 and the stream interaction data 150. In this example, the machine-learning model 185 determines the relationship based on the contact stream 130, the configuration parameters 134, the stream interaction data 150, and the success metric 132.

In this example, the contact stream 170 is modified based on example outputs from the trained machine-learning model 185. For instance, the configuration parameters 174 received by the stream sequencing module 120 indicate that contact stream 170 includes an order of contact items, such as contact item 112a" followed by 112b" followed by 112c". The received configuration parameters 174 also indicate that contact items 112a" and 112b" are delivered to a computing device of an employee via an email communication channel, and that contact item 112c" is delivered to a computing device of a manager of the employee via an online messaging service communication channel. The configuration data 184 provided by the machine-learning model 185 indicates that the success probability 182 is optimized if the configuration parameters 174 are modified. For instance, the configuration data 184 indicates example modifications of a modified order of the contact items, such as 112b" followed by 112a" followed by 112c"; a modified communication channel, such as an online messaging service communication channel for contact item 112a"; and a modified delivery recipient, such as contact item 112c" is delivered to a computing device of an information technology ("IT") specialist.

In this example, the stream sequencing module 120 modifies the contact stream 170 based on the configuration data 184 provided by the machine-learning model 185, such as by modifying the configuration parameters 174. In the modified contact stream 170, the contact item 112b" is delivered to the recipient computing device 160 via an email communication channel. Responsive to receiving data indicating that a trigger action has been performed by the recipient computing device 160 (e.g., the recipient user has watched a tutorial video at a website indicated by contact item 112b"), the contact item 112a" is delivered to the recipient computing device 160 via the modified online messaging service communication channel, such as a message box displayed at the website where the tutorial video was watched. In addition, responsive to determining that an additional trigger action is performed (e.g., the recipient computing device 160 has downloaded a security update indicated by the message box), the contact item 112c" is delivered. In this example, the contact item 112c" is delivered to an additional computing device that is associated with the IT specialist, indicating, for example, that the security update download is completed. Some or all of the example modifications are performed after delivery of at least a portion of the contact stream 170. Based on an output received from the machine-learning model 185, such as additional configuration data, contact item 112c" is modified to be delivered to the additional computing device of the IT specialist subsequent to delivery of contact item 112b".

In some embodiments, a contact stream is sequenced based on inputs from a computing device, such as inputs received via a user interface. Additionally or alternatively, the user interface displays recommendation data for the contact stream, such as a success probability or a modification (or recommended modification) that are determined based on an output from a machine-learning model. In some cases, the recommendation data is displayed responsive to a user interface input that indicates a configuration of the contact stream. For example, the user interface displays one or more of a success probability or a modification that are determined for the contact stream based on the configuration indicated by the inputs to the user interface. In some cases, the user interface displays multiple sets of recommendation data (e.g., successive displays, simultaneous displays) in response to multiple inputs. For instance, the displayed recommendation data is updated responsive to each additional input modifying the configuration of the contact stream, such as real-time updates to the displayed recommendation data.

Figure 2:
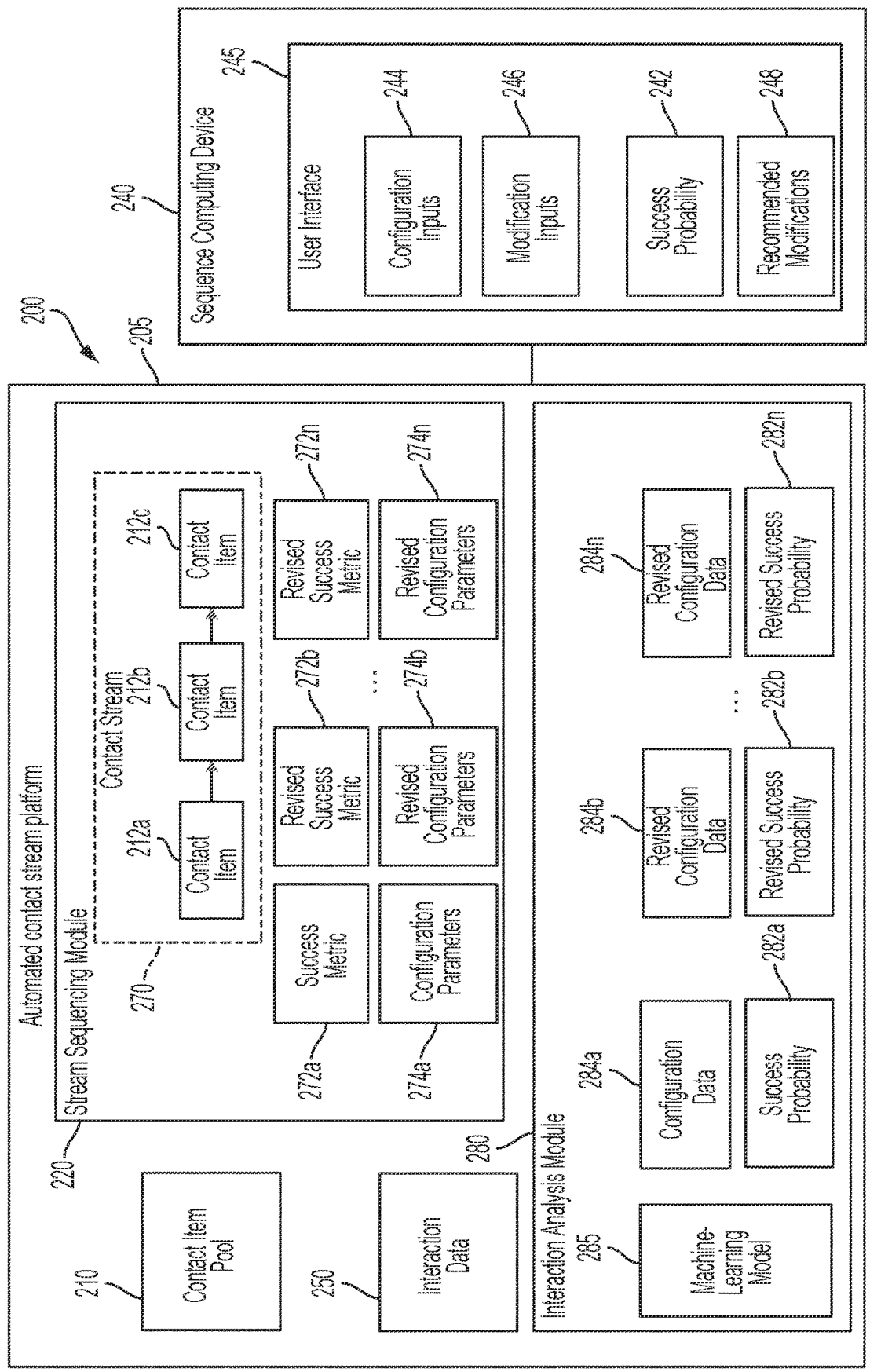
FIG. 2 is a diagram depicting an example of an automated contact stream platform that is configured to provide a user interface for generating or modifying one or more contact streams, according to certain embodiments.

FIG. 2 is a diagram depicting an example of an online computing environment 200 that includes an automated contact stream platform 205 and a sequence computing device 240. Additionally or alternatively, the automated contact stream platform 205 includes a stream sequencing module 220 and an interaction analysis module 280. In some cases, the interaction analysis module 280 includes a machine-learning model 285. The automated contact stream platform 205 is configured to generate or modify one or more of a contact stream or configuration parameters for a contact stream, such as modifications based on outputs from the machine-learning model 285. In some embodiments, the sequence computing device 240 is associated with a user, such as a user who utilizes the automated contact stream platform 205 to compose one or more contact streams.

In some embodiments, the sequence computing device 240 provides a user interface 245. The automated contact stream platform 205 is configured to, for instance, provide data to and receive data from the sequence computing device 240 via the user interface 245. For example, the user interface 245 receives one or more inputs indicating a configuration of a contact stream, such as configuration inputs 244. The configuration inputs 244 indicate, for example, one or more success metrics for the contact stream being configured. Additionally or alternatively, the configuration inputs 244 indicate one or more configuration parameters for the contact stream being configured.

In FIG. 2, the automated contact stream platform 205 receives the configuration inputs 244. In some cases, the stream sequencing module 220 sequences a contact stream 270 based on the configuration inputs 244. For example, the stream sequencing module 220 generates a success metric 272a based on the success metric indicated in the configuration inputs 244. Additionally or alternatively, the stream sequencing module 220 generates configuration parameters 274a based on configuration parameters indicated by the configuration inputs 244. Furthermore, based on the configuration inputs 244, the stream sequencing module 220 selects one or more contact items from a contact item pool 210 that is included in the automated contact stream platform 205. For example, the stream sequencing module 220 sequences the contact stream 270 to include selected contact items 212a, 212b, and 212c corresponding to respective contact items included in the contact item pool 210.

In the automated contact stream platform 205, the interaction analysis module 280 receives an indication of the sequenced contact stream 270. Additionally or alternatively, the machine-learning model 285 identifies one or more relationships between data associated with the contact stream 270 and contact stream interaction data 250. The interaction data 250 includes, for example, training or historical data describing interactions with additional contact streams (such as stream interaction data 150, described in regards to FIG. 1). For example, the machine-learning model 285 determines one or more relationships among the interaction data 250 and one or more of the success metric 272a, the configuration parameters 274a, or at least one of the contact items 212a, 212b, or 212c. Additionally or alternatively, the machine-learning model 285 provides one or more outputs corresponding to the configuration parameters 274a and the success metric 272a, such as configuration data 284a and a success probability 282a.

In the online computing environment 200, the automated contact stream platform 205 provides to the user interface 245 data describing the outputs from the machine-learning model 285. For example, the user interface 245 displays a success probability 242 that is based on data indicating the success probability 282a. Additionally or alternatively, the user interface 245 displays one or more recommended modifications 248 that are based on additional data indicating the configuration data 284a. In some embodiments, the user interface 245 displays one or more of the success probability 242 or the recommended modifications 248 in real-time, such as a period of time with the duration short enough to be unobserved by a person using the sequence computing device 240. For example, the automated contact stream platform 205 performs sequencing and analysis of the contact stream 270 responsive to determining that the user interface 245 has received the configuration inputs 244 (e.g., without waiting for an additional command to perform sequencing and analysis). Additionally or alternatively, the automated contact stream platform 205 provides outputs to the user interface 245 responsive to the completion of sequencing and analysis, causing the success probability 242 and the recommended modifications 248 to be displayed in real-time, such as within a few seconds of receiving the configuration inputs 244. In some cases, the user interface 245 displays the configuration inputs 244 simultaneously with the success probability 242 or the recommended modifications 248, such as in respective portions of the user interface 245. For example, the user interface 245 concurrently displays the configuration inputs 244 in a stream sequencing display area and one or more of the success probability 242 or the recommended modifications 248 in an evaluation display area.

In the automated contact stream platform 205, the contact stream 270 is modified based on additional inputs received via the user interface 245. For example, the user interface 245 receives one or more inputs indicating a modification of a contact stream, such as modification inputs 246. The modification inputs 246 indicate a modification to one or more of, for example, the success metric 272a, the configuration parameters 274a, or at least one of the contact items 212a, 212b, or 212c. Non-limiting examples of the indicated modifications include changing a communication channel, trigger action, or intended recipient of one or more contact items; changing an order of contact items; selecting an additional contact item (e.g., from the contact item pool 210); removing a contact item from the contact stream 270; updating, adding, or removing a criteria of the success metric 272a; or any other suitable modification to the contact stream 270.

Responsive to receiving the modification inputs 246, the stream sequencing module 220 modifies the contact stream 270. For example, the stream sequencing module 220 generates a revised success metric 272b based on a revised success metric indicated in the modification inputs 246. Additionally or alternatively, the stream sequencing module 220 generates revised configuration parameters 274b based on revised configuration parameters indicated in the modification inputs 246. In some cases, the stream sequencing module 220 revises one or more contact items included in the contact stream 270 based on the modification inputs 246. The contact stream 270 is modified based on one or more of the revised success metric 272b or the revised configuration parameters 274b. FIG. 2 depicts the revised success metric 272b and the revised configuration parameters 274b as data items additional to the success metric 272a and the configuration parameters 274a, but other configurations are possible. For example, a data item indicating a success metric (or a configuration parameter) could be modified to include a value of a revised success metric (or a revised configuration parameter) indicated by modification inputs. In some embodiments, the automated contact stream platform 205 (or an additional computing system) stores an indication of the contact stream prior to modification. For example, the automated contact stream platform 205 could store a copy of the contact stream 270 (or related success and/or configuration data) that is not modified based on the modification inputs 246.

In the automated contact stream platform 205, the interaction analysis module 280 receives an indication of the modified contact stream 270. Additionally or alternatively, the machine-learning model 285 identifies one or more relationships between the modified contact stream 270 and the contact stream interaction data 250. Based on the identified relationships, the machine-learning model 285 provides one or more additional outputs corresponding to the revised configuration parameters 274*b* and the revised success metric 272*b*, such as revised configuration data 284*b* and a revised success probability 282*b*. In some cases, the relationships identified based on the modified contact stream 270 indicate an improvement in the revised success probability 282*b* as compared to the success probability 282*a*.

In the online computing environment 200, the automated contact stream platform 205 provides to the user interface 245 additional data describing the additional outputs from the machine-learning model 285. For example, the user interface 245 modifies the success probability 242 based on data indicating the revised success probability 282*b*. Additionally or alternatively, the user interface 245 modifies the recommended modifications 248 based on data indicating the revised configuration data 284*b*. In some cases, the user interface 245 displays multiple indications of the success probability 242 or the recommended modifications 248 (or both). For example, the user interface 245 displays multiple success probabilities and recommend modifications that are correlated with respective configuration and/or modification inputs provided to the automated contact stream platform 205. In some cases, displaying multiple success probabilities and recommended modifications enables a user to more easily evaluate an effect of the configuration and/or modification inputs on the contact stream that is being sequenced.

In the automated contact stream platform 205, the contact stream 270 can be iteratively modified based on further additional inputs received via the user interface 245. For example, the user interface 245 receives additional inputs indicating additional modifications of the contact stream 270. Responsive to receiving the additional inputs, the stream sequencing module 220 performs additional modifications to the contact stream 270, such as additional modifications based on one or more of additional revised success metrics or additional revised configuration parameters. Additionally or alternatively, the machine-learning model 285 provides additional outputs corresponding to the additional revised configuration parameters and additional revised success metrics. The automated contact stream platform 205 provides to the user interface 245 data describing the additional outputs. In some cases, additional modification inputs are provided via the user interface 245 until an nth modification of the contact stream 270 is performed, such as a modification based on a revised success metric 272*n* and revised configuration parameters 274*n*. Responsive to the nth modification, the machine-learning model 285 provides revised configuration data 284*n* and a revised success probability 282*n*. The automated contact stream platform 205 provides to the user interface 245 additional data describing the revised configuration data 284*n* and revised success probability 282*n* outputs. In some cases, the contact stream 270 is released (e.g., to one or more recipient computing devices) subsequent to the nth modification.

In some cases, iterative modifications to a contact stream enable a user to more easily and more efficiently evaluate the contact stream being sequenced. For example, real-time updates to the user interface 245 allow a user to rapidly receive and interpret the results of modifications to the contact stream being sequenced. Additionally or alternatively, iterative modifications enable the user to readily evaluate the contact stream while it is being sequenced, prior to releasing the contact stream to the one or more intended recipients. Evaluation of a contact stream prior to release improves the contact stream's effectiveness at conveying information to an intended recipient. Additionally or alternatively, evaluation of the contact stream prior to release reduces time and cost related to conveying the information, such as by reducing duplicated or ineffective contact items.

Figure 3:
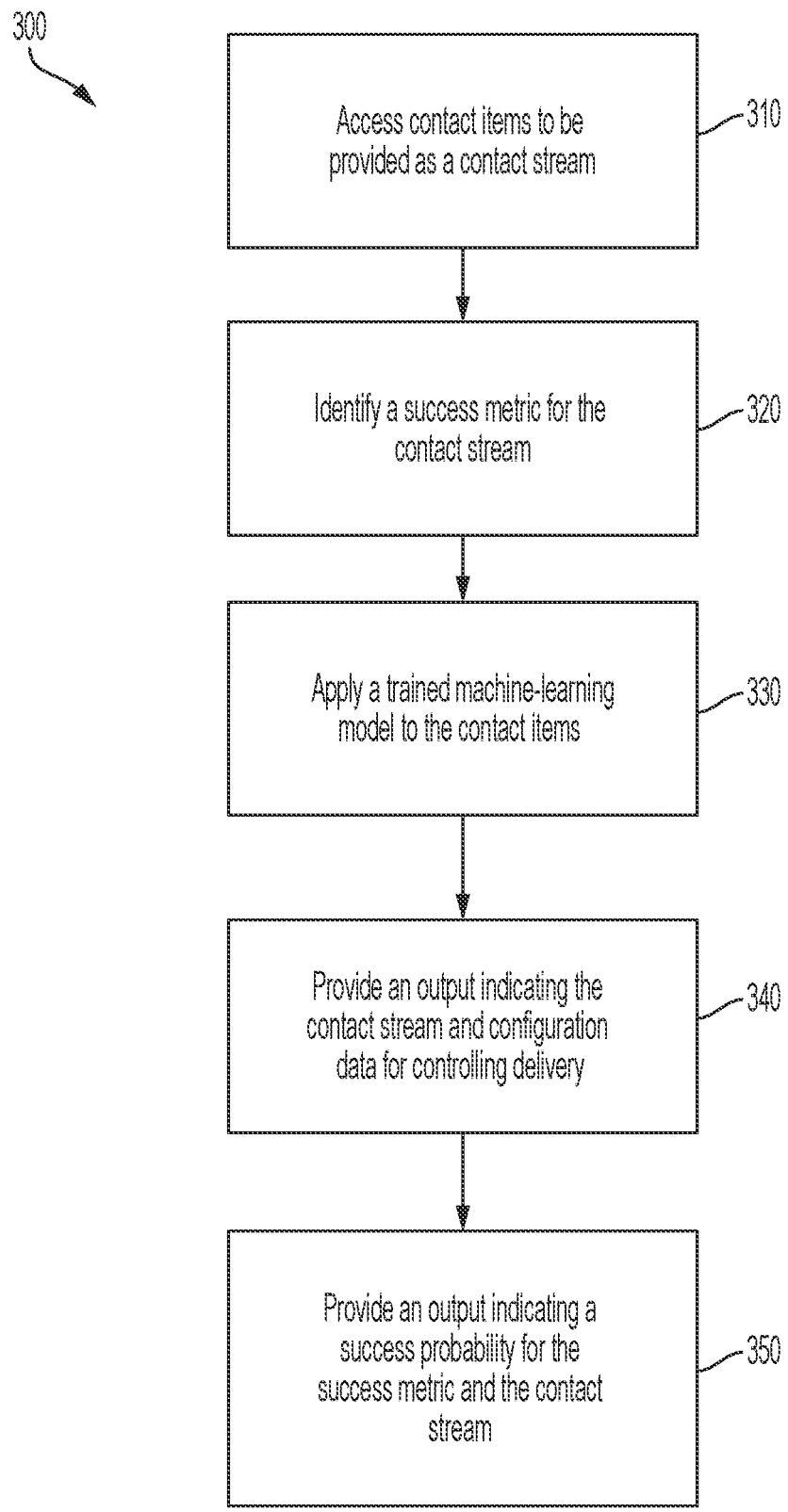
FIG. 3 is a flow chart depicting an example of a process for automatically generating or modifying a contact stream, according to certain embodiments.

FIG. 3 is a flow chart depicting an example of a process 300 for automatically generating or modifying a contact stream. In some embodiments, such as described in regards to FIGS. 1-2, one or more computing devices implementing an automated contact stream platform perform operations described in FIG. 3, by executing suitable program code. For illustrative purposes, the process 300 is described with reference to the examples depicted in FIGS. 1-2. Other implementations, however, are possible.

At block 310, the process 300 involves accessing a set of contact items which are available to be included in a contact stream. The contact stream includes, for instance, the accessed contact items sequenced for delivery via one or more electronic communication channels. Additionally or alternatively, the contact stream is associated with configuration parameters. In some cases, the set of contact items is to be provided to one or more user devices. For example, a set of the contact items 112 in the contact item pool 110 is accessed to be provided to the recipient computing device 160 as the contact stream 130. In the contact stream 130, each of the included contact items 112*a'*, 112*b'*, and 112*c'* is associated with a respective electronic communication channel, such as communication channels indicated by the configuration parameters 134.

At block 320, the process 300 involves identifying a success metric for the contact stream. In some embodiments, the success metric indicates an engagement with the contact stream, such as an activity engaging with one or more delivered contact items from the contact stream. Additionally or alternatively, the success metric indicates an action to be performed following the engagement with the contact stream. In the process 300, one or more of the engagement or the action are performed in an online computing environment, such as the online computing environment 100. For example, the recipient computing device 160 engages with one or more delivered contact items from the contact stream 130, or performs one or more actions, such as a trigger action, following engagement with the delivered contact items. Interaction data describing the engagement or the action is received, such as stream interaction data 150 received by the automated contact stream platform 105.

At block 330, the process 300 involves applying a machine-learning model to the set of contact items. The machine-learning model is trained, for example, to identify one or more relationships among configuration parameters and sequences of actions and outcomes. In some cases, the relationships are identified among configuration parameters that control delivery of contact streams, such as delivery in an online computing environment. Additionally or alternatively, the relationships are identified among actions and outcomes that are performed within the online computing environment. For example, the machine-learning model 185 is trained to identify relationships among configuration parameters 134 and stream interaction data 150. In some embodiments, the applied machine-learning model identifies relationships among configuration parameters that are associated with the set of contact items (or with the contact stream including the set). Additionally or alternatively, the applied machine-learning model performs analysis of the set of contact items based on additional information, such as the identified success metric.

At block 340, the process 300 involves providing an output indicating the contact stream that includes the set of contact items. Additionally or alternatively, the output indicates configuration data for controlling delivery of the contact stream. In some embodiments, the configuration data includes one or more values for configuration parameters of the contact stream. The values, for example, are computed by the machine-learning model for achieving the identified success metric, such as to optimize a probability of achieving the identified success metric via delivery of the contact stream.

At block 350, the process 300 involves providing an output indicating a success probability. The success probability is associated, for example, with one or more of the identified success metric or the contact stream including the set of contact items. In some cases, the success probability indicates a probability of achieving the identified success metric by creating the contact stream. For example, the success probability indicates a likelihood of, if the contact stream were to be created and delivered, whether an engagement or action would be performed following engagement with a delivered contact item from the contact stream. As non-limiting examples, the success probability is indicated by a numeric percentage, a Boolean value (e.g., achieved/not achieved), a set of categories (e.g., "unlikely," "highly likely"), or any other suitable probability indication.

In some implementations, operations related to one or more of blocks 340 or 350 are optional. An automated contact stream platform performs, for example, operations related to block 340 and omits operations related to block 350. Additionally or alternatively, the automated contact stream platform performs operations related to block 350 and omits operations related to block 340. For example, a machine-learning model included in an automated contact stream platform provides an output that indicates a contact stream and configuration data controlling delivery of a contact stream, while omitting a success probability. Additionally or alternatively, the machine-learning model provides another output that indicates a success probability, while omitting a contact stream and configuration data. Furthermore, the machine-learning model provides one or more additional outputs that indicate any combination of a contact stream, configuration data controlling delivery of a contact stream, a success probability, or additional information based on the machine-learning model's analysis of a set of contact items.

Figure 4:
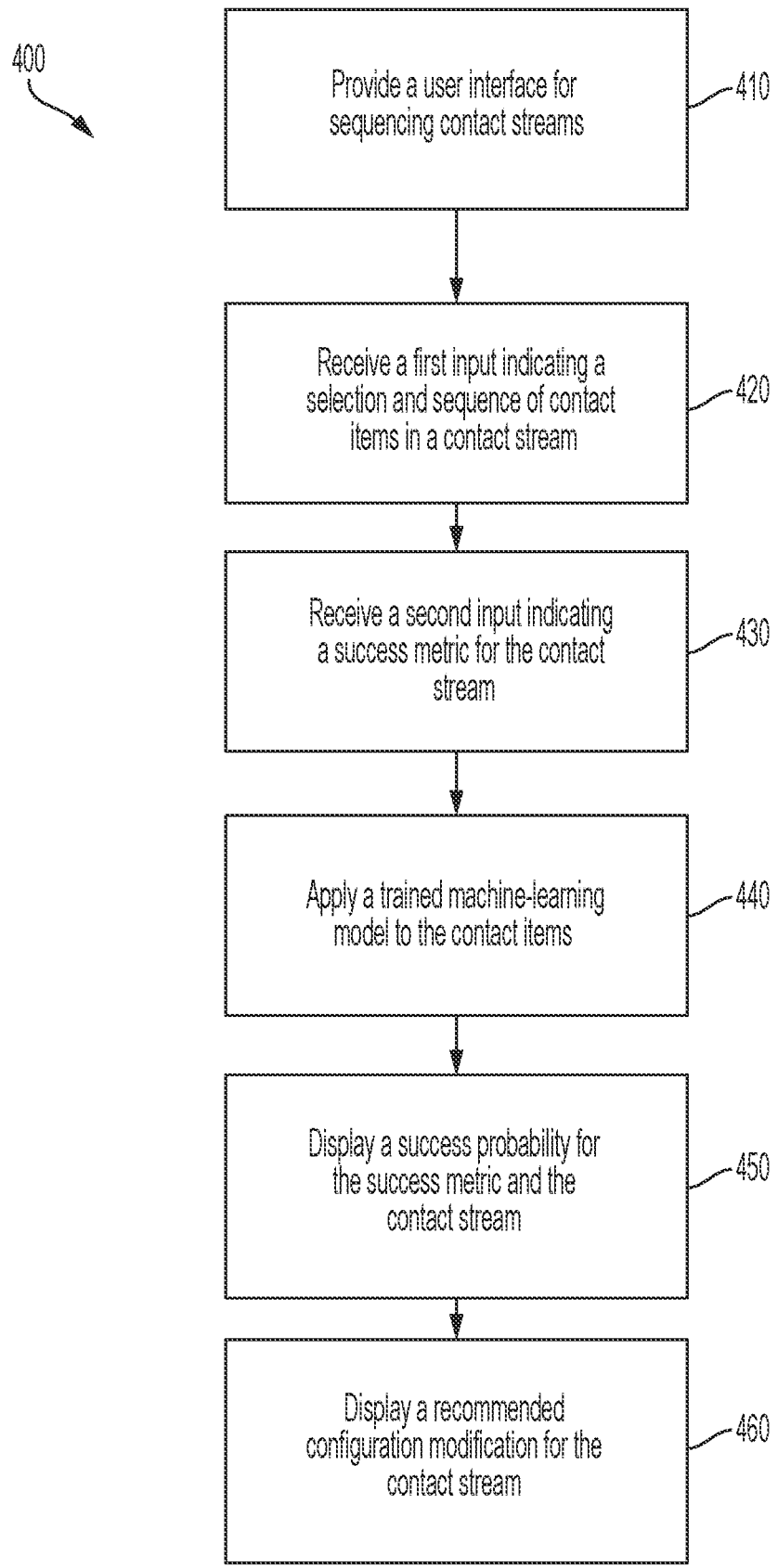
FIG. 4 is a flow chart depicting an example of a process for providing a user interface for generating or modifying a contact stream in real-time iterations, according to certain embodiments.

FIG. 4 is a flow chart depicting an example of a process 400 for providing a user interface for generating or modifying a contact stream in real-time iterations. In some embodiments, such as described in regards to FIGS. 1-3, one or more computing devices implementing an automated contact stream platform perform operations described in FIG. 4, by executing suitable program code. For illustrative purposes, the process 400 is described with reference to the examples depicted in FIGS. 1-3. Other implementations, however, are possible.

At block 410, the process 400 involves providing a user interface that is configured to receive inputs and provide outputs that are related to sequencing of contact streams. In some embodiments, an automated contact stream platform provides the user interface to an additional computing device, such as to a sequence computing device 240. Additionally or alternatively, the automated contact stream platform is configured to receive inputs or provide outputs related to sequencing a contact stream via the user interface. For example, via the user interface 245, the automated contact stream platform 205 receives inputs and provides outputs that are related to sequencing of the contact stream 270.

In some embodiments, the user interface includes a stream sequencing area that is configured to display information related to generating or modifying a contact stream, such as indications of contact items available for inclusion in the contact stream, or indications of configuration parameters related to delivery of the contact stream, or other suitable information. In addition, the stream sequencing area is configured to receive inputs related to generating or modifying a contact stream, such as selections of one or more contact items that are selected for the contact stream, an indication of a success metric for the contact stream, configuration inputs describing configuration of the contact stream, or other suitable inputs. Additionally or alternatively, the user interface includes an evaluation area that is configured to display information related to evaluation of a contact stream that is being generated or modified, such as a success probability, one or more modifications that are available for the contact stream, or other suitable information.

At block 420, the process 400 involves receiving a first input indicating a selection of multiple contact items, such as contact items that are available to be included in a contact stream that is being sequenced. Additionally or alternatively, the first input indicates a sequence of the selected contact items in the contact stream being sequenced. The contact stream includes, for instance, the selected contact items arranged in the indicated sequence for delivery via one or more electronic communication channels. In some cases, the selected contact items are to be provided to one or more user devices. In some embodiments, the first input is received via the stream sequencing area in the user interface. For example, the automated contact stream platform 205 receives, via a stream sequencing area in the user interface 245, the configuration inputs 244. In some cases, the configuration inputs 244 indicate a selection or a sequence (or both) of multiple contact items in the contact item pool 210 for the contact stream 270. Additionally or alternatively, the configuration inputs 244 indicate additional data describing a configuration of the contact stream 270, such as the configuration parameters 274a.

At block 430, the process 400 involves receiving a second input indicating a success metric, such as a success metric related to the contact stream that is being sequenced. In some cases, the success metric indicates an engagement with the contact stream, such as an activity engaging with one or more contact items from the contact stream. Additionally or alternatively, the success metric indicates an action to be performed following the engagement with the contact stream. In the process 400, one or more of the engagement or the action are indicated as being performed in an online computing environment subsequent to delivery of one or more contact items from the contact stream. For example, the success metric indicates an engagement or an activity that could be performed by a recipient computing device that receives one or more contact items from the contact stream (e.g., if the contact stream were delivered as sequenced). In some embodiments, the second input is received via the stream sequencing area in the user interface.

At block 440, the process 400 involves applying a machine-learning model to the selected contact items. The machine-learning model is trained, for example, to identify one or more relationships among configuration parameters and sequences of actions and outcomes. In some cases, the relationships are identified among configuration parameters that control delivery of contact streams, such as delivery in an online computing environment. Additionally or alternatively, the relationships are identified among actions and outcomes that are performed within the online computing environment. For example, the machine-learning model 285 is trained to identify relationships among configuration parameters 274*a* and interaction data 250. In some embodiments, the applied machine-learning model identifies relationships among configuration parameters that are associated with the selected contact items (or with the contact stream including the items). Additionally or alternatively, the applied machine-learning model performs analysis of the selected contact items based on additional information, such as the success metric indicated by the second input.

At block 450, the process 400 involves displaying a success probability, such as via the provided user interface. The success probability is associated, for example, with one or more of the indicated success metric or the contact stream including the selected contact items. In some cases, the success probability indicates a probability of achieving the identified success metric by creating the contact stream. For example, the success probability indicates a likelihood of, if the contact stream were to be created and delivered, whether an engagement or action would be performed following engagement with a delivered contact item from the contact stream. In some cases, the success probability is displayed in the evaluation area of the user interface. For example, the automated contact stream platform 205 displays, via an evaluation area in the user interface 245, the success probability 242.

At block 460, the process 400 involves displaying configuration data, such as configuration data for controlling delivery of the contact stream being sequenced. In some embodiments, the configuration data includes one or more values for configuration parameters, such as values computed by the machine-learning model for achieving the success metric indicated by the second input. In some cases, the configuration data is displayed in the evaluation area of the user interface. For example, the automated contact stream platform 205 displays, via an evaluation area in the user interface 245, the recommended modifications 248.

In some implementations, operations related to one or more of blocks 450 or 460 are optional. An automated contact stream platform performs, for example, operations related to block 450 and omits operations related to block 460. Additionally or alternatively, the automated contact stream platform performs operations related to block 460 and omits operations related to block 450. For example, an automated contact stream platform provides to a user interface for display a success probability, while omitting configuration data. Additionally or alternatively, the automated contact stream platform provides to the user interface for display configuration data for a contact stream, while omitting a success probability. Furthermore, the automated contact stream platform provides to the user interface additional information for display, such as information indicating any combination of a contact stream being sequenced, contact items available for inclusion in the contact stream, configuration data controlling delivery of the contact stream, a success probability, or any suitable additional information related to generating or modifying the contact stream being sequenced.

In some implementations, operations related to one or more of blocks 420, 430, 440, 450, or 460 are repeated. For example, subsequent to displaying a success probability or configuration data, such as in regards to one or more of blocks 450 or 460, an additional input is received indicating a modified success metric or a modified selection or sequence of contact items, such as in regards to one or more of blocks 420 or 430. Responsive to receiving the additional input, the trained machine-learning model is applied to the contact items (or modified contact items) responsive to receiving an output from the trained machine-learning model, an additional success probability or configuration data is provided for display via the user interface. In some cases, the user interface allows iterative modifications of a contact stream being sequenced, such as by displaying additional success probabilities or configuration data responsive to receiving additional inputs indicating a success metric, selection of contact items, or sequence of contact items.

Figure 5:
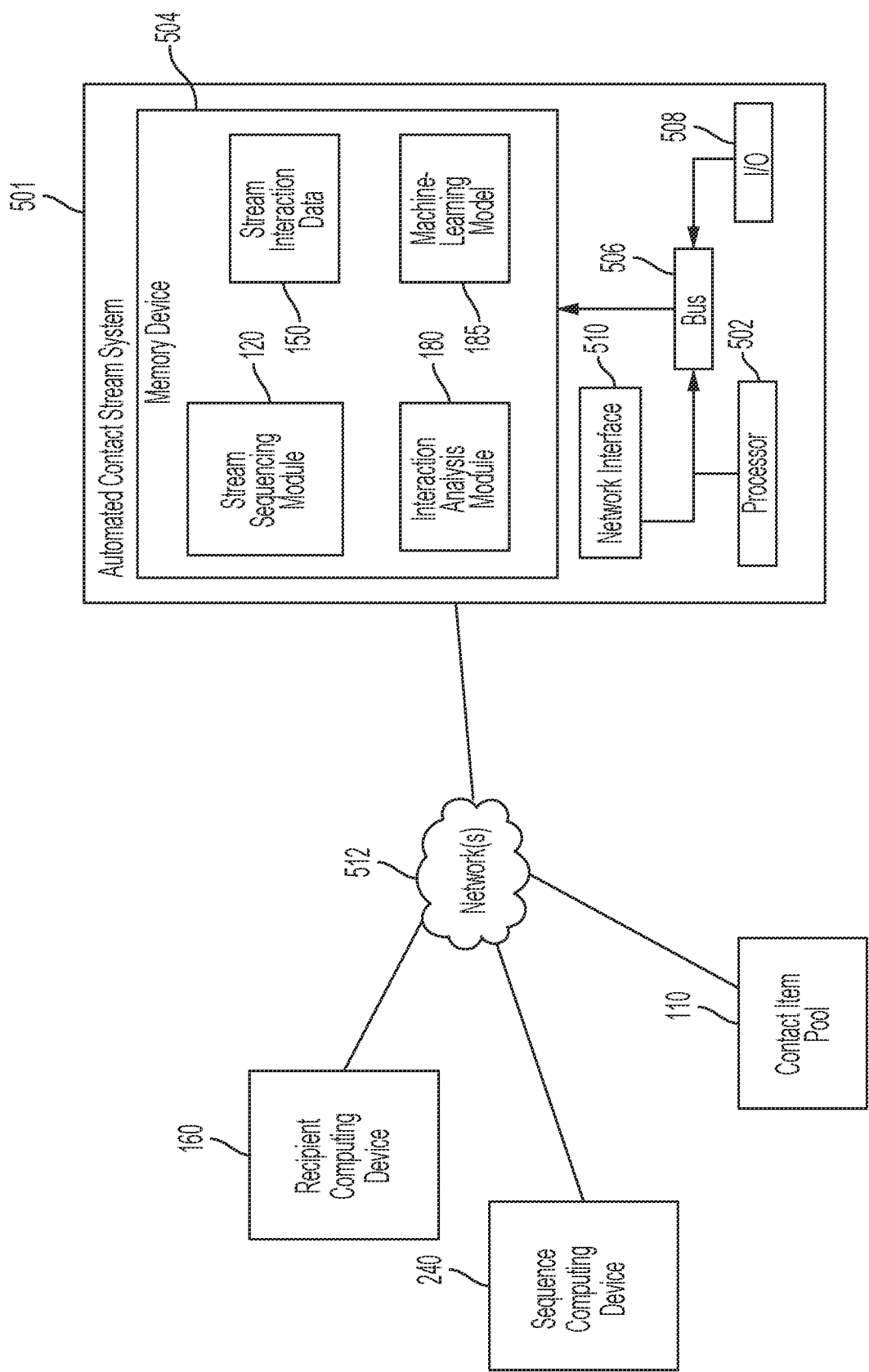
FIG. 5 is a block diagram depicting an example of a computing system for implementing an automated contact stream platform, according to certain embodiments.

Any suitable computing system or group of computing systems can be used for performing the operations described herein. For example, FIG. 5 is a block diagram depicting a computing system configured as an automated contact stream platform, according to certain embodiments.

The depicted example of an automated contact stream system 501 includes one or more processors 502 communicatively coupled to one or more memory devices 504. The processor 502 executes computer-executable program code or accesses information stored in the memory device 504. Examples of processor 502 include a microprocessor, an application-specific integrated circuit ("ASIC"), a field-programmable gate array ("FPGA"), or other suitable processing device. The processor 502 can include any number of processing devices, including one.

The memory device 504 includes any suitable non-transitory computer-readable medium for storing the stream sequencing module 120, interaction analysis module 180, machine-learning model 185, stream interaction data 150, and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The automated contact stream system 501 may also include a number of external or internal devices such as input or output devices. For example, the automated contact stream system 501 is shown with an input/output ("I/O") interface 508 that can receive input from input devices or provide output to output devices. A bus 506 can also be included in the automated contact stream system 501. The bus 506 can communicatively couple one or more components of the automated contact stream system 501.

The automated contact stream system 501 executes program code that configures the processor 502 to perform one or more of the operations described above with respect to FIGS. 1-4. The program code includes operations related to, for example, one or more of the stream sequencing module 120, the interaction analysis module 180, the machine-learning model 185, the stream interaction data 150, or other suitable applications or memory structures that perform one or more operations described herein. The program code may be resident in the memory device 504 or any suitable computer-readable medium and may be executed by the processor 502 or any other suitable processor. In some embodiments, the program code described above, the stream sequencing module 120, the interaction analysis module 180, the machine-learning model 185, and the stream interaction data 150 are stored in the memory device 504, as depicted in FIG. 5. In additional or alternative embodiments, one or more of the stream sequencing module 120, the interaction analysis module 180, the machine-learning model 185, the stream interaction data 150, and the program code described above are stored in one or more memory devices accessible via a data network, such as a memory device accessible via a cloud service.

The automated contact stream system 501 depicted in FIG. 5 also includes at least one network interface 510. The network interface 510 includes any device or group of devices suitable for establishing a wired or wireless data connection to one or more data networks 512. Non-limiting examples of the network interface 510 include an Ethernet network adapter, a modem, and/or the like. In some cases, one or more of the recipient computing device 160, the sequence computing device 240, or the contact item pool 110 are connected to the automated contact stream system 501 via network 512, and can perform some of the operations described herein, such as receiving delivered contact items, providing inputs related to sequencing a contact stream, or providing contact items available for sequencing. The automated contact stream system 501 is able to communicate with one or more of the recipient computing device 160, the sequence computing device 240, or the contact item pool 110 using the network interface 510. Although FIG. 5 depicts the contact item pool 110 as connected to automated contact stream system 501 via the networks 512, other embodiments are possible, including the contact item pool 110 being connected to the automated contact stream system 501 as a peripheral component (e.g., via the I/O interface 508), running as a program in the memory 504 of automated contact stream system 501, or other suitable configurations.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A system for determining a success probability that indicates a probability of a contact stream achieving an identified success metric, the system comprising:
    a means for providing a user interface that is configured to receive inputs for sequencing contact streams, the user interface including a stream sequencing area and an evaluation area;
    a means for receiving, via the stream sequencing area, a first input for a machine-learning model, the first input indicating (i) a selection of a first subset of contact items and (ii) a sequence of the selected first subset of the contact items in a contact stream, wherein the contact stream includes the selected first subset of the contact items sequenced for delivery via one or more electronic communication channels;
    a means for receiving, via the stream sequencing area, a second input for the machine-learning model, the second input indicating a success metric, wherein the success metric indicates one or more of (i) an engagement with the contact stream and (ii) an action within an online environment to be performed following engagement with the contact stream;
    a means for applying, to the selected first subset of the contact items, the machine-learning model that is trained to identify, based on the first input and the second input, relationships among (i) configuration parameters that control delivery of contact streams, (ii) the success metric indicated by the second input, and (iii) sequences of actions and outcomes performed within online environments;
    a means for displaying, via the evaluation area, a first success probability computed as a first output by the machine-learning model, the first success probability indicating a probability of achieving the success metric by creating the contact stream with the sequence of the selected first subset of the contact items and one or more values of the configuration parameters;

a means for receiving, via the stream sequencing area, a third input for the machine-learning model, the third input indicating (i) a modification to the first subset of contact items and (ii) an additional sequence of the modified first subset of the contact items in the contact stream;

a means for applying, based on the third input and the second input, the machine-learning model to the modified first subset of the contact items; and a means for displaying, via the evaluation area, a second success probability computed as a second output by the machine-learning model, the second success probability indicating an additional probability of achieving the success metric by creating the contact stream with the additional sequence of the modified first subset of the contact items and the one or more values of the configuration parameters, wherein the second success probability is displayed in addition to the first success probability.

2. The system of claim 1, wherein the one or more values of the configuration parameters are indicated in an additional input received via the stream sequencing area.

3. The system of claim 2, the system further comprising:
a means for displaying a modification to the one or more values of the configuration parameters indicated in the additional input, wherein the modification is based on at least one configuration parameter value that has been computed by the machine-learning model for achieving the success metric.

4. The system of claim 1, the system further comprising a means for displaying, via the evaluation area, configuration data for controlling a delivery of the contact stream, wherein the configuration data includes configuration parameter values that have been computed by the machine-learning model for achieving the success metric.

5. The system of claim 1, wherein the stream sequencing area displays the selected first subset of the contact items concurrently with the evaluation area displaying the first success probability.

6. The system of claim 1, the system further comprising:
a means for, subsequent to sending a first contact item that is included in the contact stream, modifying the contact stream to include a second subset of the contact items; and
a means for displaying, via the user interface, the modified contact stream.

7. A method in which one or more processing devices perform operations comprising:
providing a user interface that is configured to receive inputs for sequencing contact streams, the user interface including a stream sequencing area and an evaluation area;
receiving, via the stream sequencing area, a first input for a machine-learning model, the first input indicating (i) a selection of a first subset of contact items and (ii) a sequence of the selected first subset of the contact items in a contact stream, wherein the contact stream includes the selected first subset of the contact items sequenced for delivery via one or more electronic communication channels;
receiving, via the stream sequencing area, a second input for the machine-learning model, the second input indicating a success metric, wherein the success metric indicates one or more of (i) an engagement with the contact stream and (ii) an action within an online environment to be performed following engagement with the contact stream;
applying, to the selected first subset of the contact items, the machine-learning model that is trained to identify, based on the first input and the second input, relationships among (i) configuration parameters that control delivery of contact streams, (ii) the success metric indicated by the second input, and (iii) sequences of actions and outcomes performed within online environments;
displaying, via the evaluation area, a first success probability computed as a first output by the machine-learning model, the first success probability indicating a probability of achieving the success metric by creating the contact stream with the sequence of the selected first subset of the contact items and one or more values of the configuration parameters;
receiving, via the stream sequencing area, a third input for the machine-learning model, the third input indicating (i) a modification to the first subset of contact items and (ii) an additional sequence of the modified first subset of the contact items in the contact stream;
applying, based on the third input and the second input, the machine-learning model to the modified first subset of the contact items; and
displaying, via the evaluation area, a second success probability computed as a second output by the machine-learning model, the second success probability indicating an additional probability of achieving the success metric by creating the contact stream with the additional sequence of the modified first subset of the contact items and the one or more values of the configuration parameters, wherein the second success probability is displayed in addition to the first success probability.

8. The method of claim 7, wherein the one or more values of the configuration parameters are indicated in an additional input received via the stream sequencing area.

9. The method of claim 8, the method further comprising:
displaying a modification to the one or more values of the configuration parameters indicated in the additional input, wherein the modification is based on at least one configuration parameter value that has been computed by the machine-learning model for achieving the success metric.

10. The method of claim 7, the method further comprising:
displaying, via the evaluation area, configuration data for controlling a delivery of the contact stream, wherein the configuration data includes configuration parameter values that have been computed by the machine-learning model for achieving the success metric.

11. The method of claim 7, wherein the stream sequencing area displays the selected first subset of the contact items concurrently with the evaluation area displaying the first success probability.

12. The method of claim 7, the method further comprising:
subsequent to sending a first contact item that is included in the contact stream, modifying the contact stream to include a second subset of the contact items; and
displaying, via the user interface, the modified contact stream.

13. A non-transitory computer-readable medium embodying program code comprising instructions which, when executed by a processor, cause the processor to perform operations comprising:

provniding a user interface that is configured to receive inputs for sequencing contact streams, the user interface including a stream sequencing area and an evaluation area;

receiving, via the stream sequencing area, a first input for a machine-learning model, the first input indicating (i) a selection of a first subset of contact items and (ii) a sequence of the selected first subset of the contact items in a contact stream, wherein the contact stream includes the selected first subset of the contact items sequenced for delivery via one or more electronic communication channels;

receiving, via the stream sequencing area, a second input for the machine-learning model, the second input indicating a success metric, wherein the success metric indicates one or more of (i) an engagement with the contact stream and (ii) an action within an online environment to be performed following engagement with the contact stream;

applying, to the selected first subset of the contact items, the machine-learning model that is trained to identify, based on the first input and the second input, relationships among (i) configuration parameters that control delivery of contact streams, (ii) the success metric indicated by the second input, and (iii) sequences of actions and outcomes performed within online environments;

displaying, via the evaluation area, a first success probability computed as a first output by the machine-learning model, the first success probability indicating a probability of achieving the success metric by creating the contact stream with the sequence of the selected first subset of the contact items and one or more values of the configuration parameters;

receiving, via the stream sequencing area, a third input for the machine-learning model, the third input indicating (i) a modification to the first subset of contact items and (ii) an additional sequence of the modified first subset of the contact items in the contact stream;

applying, based on the third input and the second input, the machine-learning model to the modified first subset of the contact items; and displaying, via the evaluation area, a second success probability computed as a second output by the machine-learning model, the second success probability indicating an additional probability of achieving the success metric by creating the contact stream with the additional sequence of the modified first subset of the contact items and the one or more values of the configuration parameters, wherein the second success probability is displayed in addition to the first success probability.

14. The non-transitory computer-readable medium of claim 13, wherein the one or more values of the configuration parameters are indicated in an additional input received via the stream sequencing area.

15. The non-transitory computer-readable medium of claim 14, the operations further comprising:

displaying a modification to the one or more values of the configuration parameters indicated in the additional input, wherein the modification is based on at least one configuration parameter value that has been computed by the machine-learning model for achieving the success metric.

16. The non-transitory computer-readable medium of claim 13, the operations further comprising:

displaying, via the evaluation area, configuration data for controlling a delivery of the contact stream, wherein the configuration data includes configuration parameter values that have been computed by the machine-learning model for achieving the success metric.

17. The non-transitory computer-readable medium of claim 13, the operations further comprising:

subsequent to sending a first contact item that is included in the contact stream, modifying the contact stream to include a second subset of the contact items; and displaying, via the user interface, the modified contact stream.

* * * * *